(No Model.)

J. A. AKINS & G. T. ELMORE.
Churn Motor.

No. 243,483. Patented June 28, 1881.

Witnesses:
J. W. Garner
H. S. D. Haines

Inventors:
J. A. Akins.
G. T. Elmore.
By H. J. Ennis Atty.

UNITED STATES PATENT OFFICE.

JACOB A. AKINS, OF TREZEVANT, TENNESSEE, AND GEORGE T. ELMORE, OF HARMONTOWN, MISSISSIPPI.

CHURN-MOTOR.

SPECIFICATION forming part of Letters Patent No. 243,483, dated June 28, 1881.

Application filed April 30, 1881. (No model.)

*To all whom it may concern:*

Be it known that we, J. A. AKINS and G. T. ELMORE, citizens of the United States, residing respectively at Trezevant, Carroll county, Tennessee, and Harmontown, La Fayette county, Mississippi, have invented certain new and useful Improvements in Churn-Motors; and we do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention has for its object to furnish a simple, efficient, and durable machine for operating the dash-rod of a churn; and it consists in the construction and arrangement of devices, as hereinafter more fully described and claimed.

Figure 1:
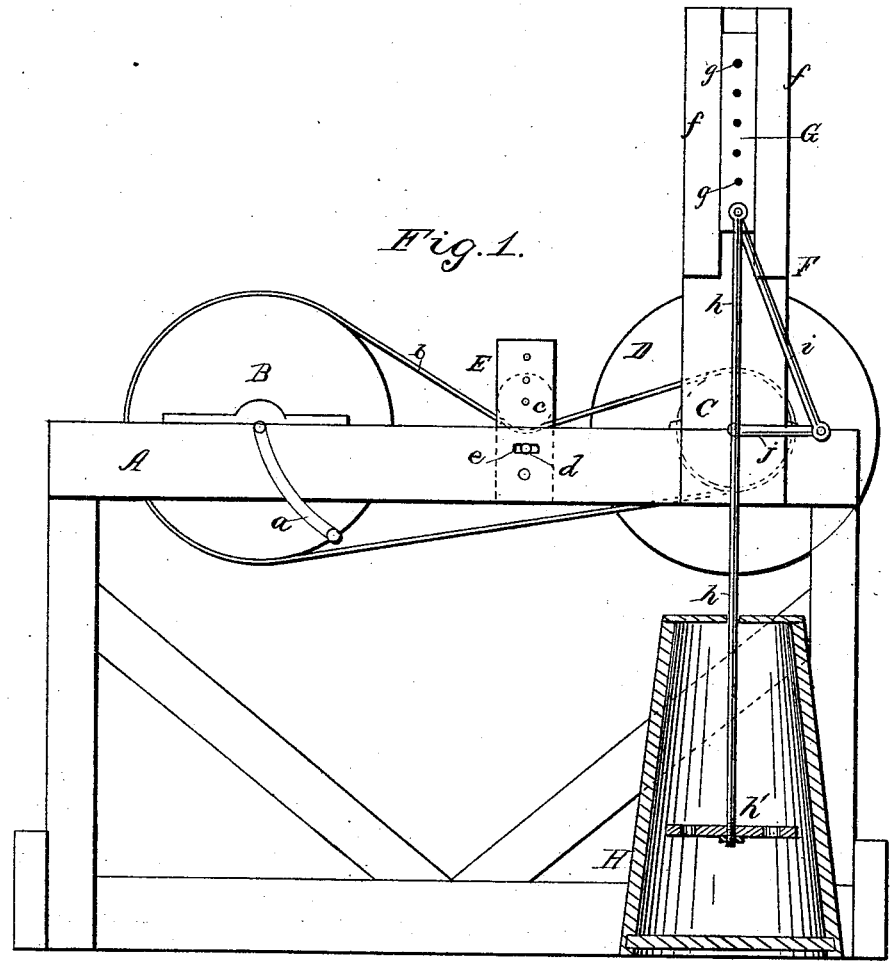
Figure 2:
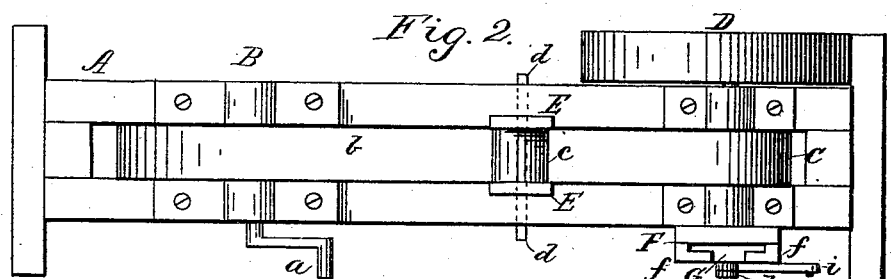

In the annexed drawings, Figure 1 is a side view, partly in section; and Fig. 2 is a top plan.

The frame A of the machine affords a bearing for the shaft of the driving-wheel B, which is provided with a crank, a, and is connected by the belt b with a pulley, C, that is journaled at the opposite end of the frame. On the same shaft with the pulley C is a fly-wheel, D.

Between the wheel B and pulley C is arranged an idler, c, that is journaled in suitable bearings in an adjustable frame, E, which is attached to the frame A by means of a pin, d, passing through an aperture or slot, e, in the frames A E. The frame E is provided with several of these apertures, one above the other, so that it may be attached to the frame A at any desired height, and so that the idler c may be journaled at the required point to regulate the tension of the belt b.

At the forward end of the frame A, opposite the fly-wheel D, is a standard, F, the upper part of which is provided with guides f f, that form a slot or groove for the reception of the vertically-sliding bar G. This bar is provided with several perforations, g g, for the attachment of a pin, inserted in either, and to which is secured the upper end of the dash-rod h, which is connected below with the dash h' in the churn H. To the same pin is also pivoted a connecting-rod, i, which is attached at its other end to a crank, j, on the pulley C.

It will thus be seen that when power is communicated to the pulley C by means of its belt-connection with the driving-wheel B the crank j and connecting-rod i, by operating the vertically-sliding bar G, will cause the dash-rod h to reciprocate in a perfectly vertical position. The length of stroke may be readily varied, as required, by changing the point at which the dash-rod and connecting-rod are attached to the sliding bar G, and the idler c being properly adjusted, the machine may be operated with satisfactory results by the expenditure of but little power.

Having thus described our invention, what we claim as new, and desire to secure by Letters Patent, is—

1. The combination of the frame A, standard F, having guides f f, sliding bar G, having perforations g, pulley C, crank i, connecting-rod j, and dash-rod h, substantially as set forth.

2. The combination, with the frame A and grooved standard F, of the adjustable frame E, carrying idler c, the wheel B, pulley C, belt b, crank i, connecting-rod j, sliding bar G, and dash-rod h, substantially as shown and described.

In testimony whereof we affix our signatures in presence of two witnesses.

JACOB A. AKINS.
G. T. ELMORE.

Witnesses:
A. HUSTON,
WM. HUSTON.